(12) United States Patent
Elliot

(10) Patent No.: US 6,450,876 B2
(45) Date of Patent: Sep. 17, 2002

(54) DIFFUSION OF AIR INTO A MOTOR-VEHICLE PASSENGER COMPARTMENT

(75) Inventor: Gilles Elliot, Courcouronnes (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/733,922

(22) Filed: Dec. 12, 2000

(30) Foreign Application Priority Data

Dec. 13, 1999 (FR) .......................................... 99 15653

(51) Int. Cl.$^7$ ................................................. B60S 1/54
(52) U.S. Cl. ...................................... 454/121; 454/127
(58) Field of Search ............................... 454/127, 121, 454/152; 237/12.3 B

(56) References Cited

U.S. PATENT DOCUMENTS

| | | | |
|---|---|---|---|
| 5,113,748 A | | 5/1992 | Shibuya |
| 5,620,366 A | * | 4/1997 | Munzel et al. ............... 454/152 |
| 5,673,964 A | * | 10/1997 | Roan et al. .................. 296/208 |
| 5,709,601 A | * | 1/1998 | Heck ........................... 454/121 |
| 5,934,744 A | * | 8/1999 | Jergens et al. ............... 296/192 |
| 6,110,037 A | * | 8/2000 | Yoshinaka ................... 454/143 |

FOREIGN PATENT DOCUMENTS

| | | |
|---|---|---|
| FR | 2756801 | 6/1998 |
| GB | 2302404 | 1/1997 |

* cited by examiner

Primary Examiner—Harold Joyce
Assistant Examiner—Derek S. Boles
(74) Attorney, Agent, or Firm—Liniak, Berenato, Longacre & White

(57) ABSTRACT

The air-treatment housing of an air-conditioning apparatus includes, in an upper face, an air outlet for demisting and aeration. A diffusion module is arranged between this upper face of the dashboard. This diffusion module features a demisting vent and aeration vents in its upper front region. The aeration vents are directed towards the passenger compartment and extend over the major part of the width of the dashboard.

9 Claims, 9 Drawing Sheets

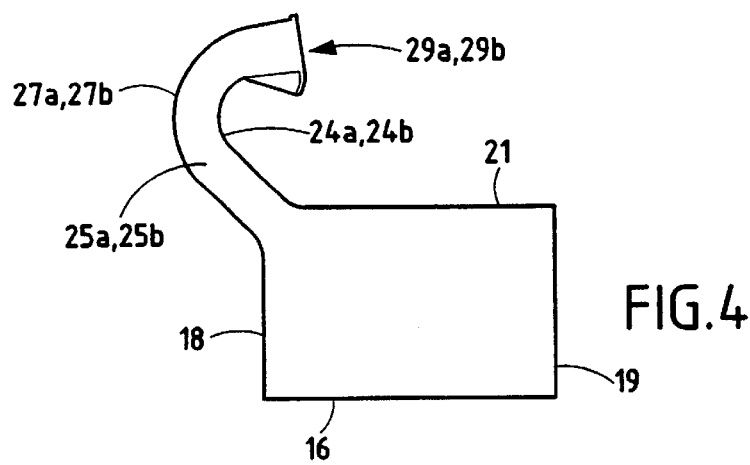
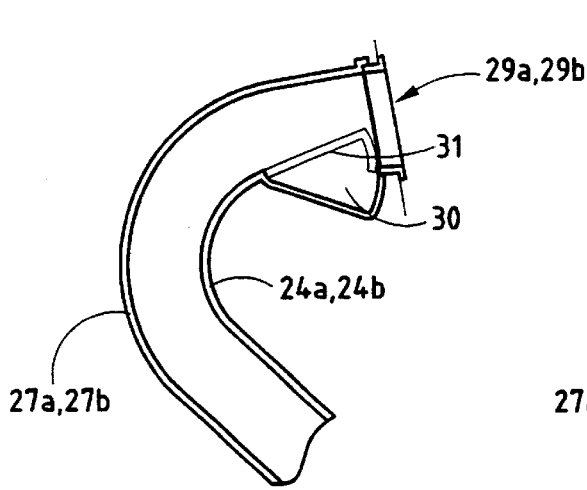
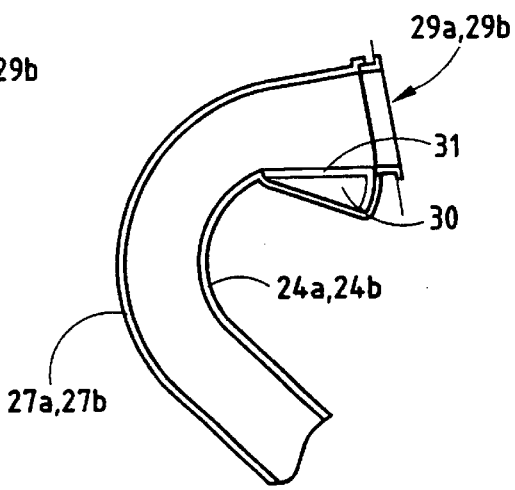
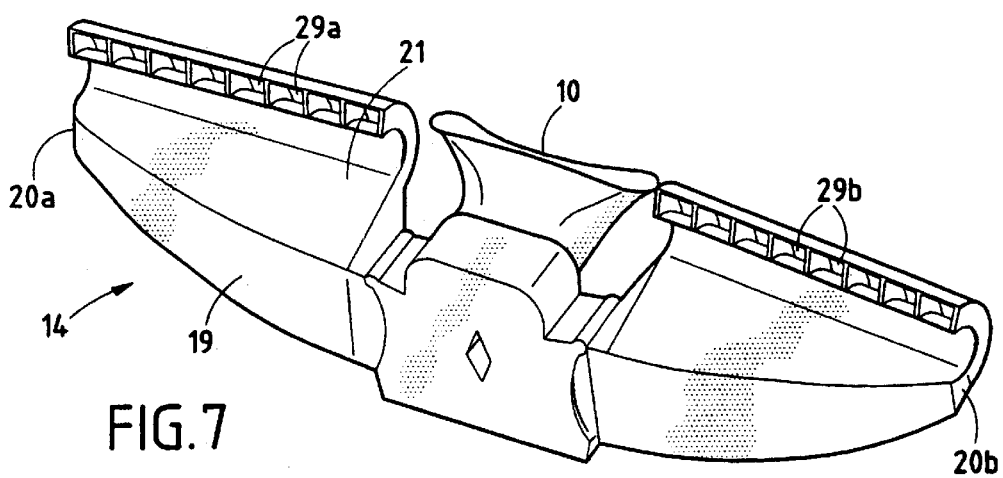

DIFFUSION OF AIR INTO A MOTOR-VEHICLE PASSENGER COMPARTMENT

FIELD OF THE INVENTION

The present invention relates to a device for heating, ventilating and/or air conditioning the passenger compartment of a motor vehicle, of the type including air treatment means being accommodated, at least partly, in a housing provided with air outlets, the demisting outlet and the aeration outlets opening out in a specifically shaped upper face of the housing and being capable of supplying treated air to at least one demisting vent and aeration vents provided in a fascia of a dashboard via ducts linking the said outlets to the said vents, the said dashboard including an upper fascia and a front fascia.

BACKGROUND OF THE INVENTION

Nowadays, the air from the air-conditioning apparatus is routed to the demisting and aeration vents via the end-to-end fitting of several pieces which are assembled when the driver's position is fitted out. Moreover, the aeration vents are usually affixed to the front fascia of the dashboard, within the envelope of the driver's or of the front passenger's arm's reach, and in particular include a central aeration vent situated above the central console, and two lateral aeration vents. These aeration vents, having limited diffusing surface areas, deliver aeration air at high speed. Moreover, the arrangement of the central aeration vent above the central console limits the volume thereof.

The international standard ISO 3958 of Feb. 15, 1996 defines arms' reach zones for the driver of a motor vehicle. These zones are defined as being contained within the outer envelope of two spheres defined geometrically with respect to the driver's seat. Each sphere corresponds to the range of movement of one of the driver's hands. The passenger's arms' reach zones can be deduced by symmetry with respect to the plane of symmetry of the passenger compartment.

The references in FIG. 10 represent the following:

Pb—the outer envelope of the dashboard of a motor vehicle,

Cd—the outer envelope of the range of movement of the driver's right hand, corresponding to gripping with three fingers, Cg—the outer envelope of the range of movement of the driver's left hand, corresponding to gripping with three fingers, Pg—the outer envelope of the range of movement of the passenger's left hand, corresponding to gripping with three fingers, Pd—the outer envelope of the range of movement of the passenger's right hand, corresponding to gripping with three fingers, Cgb—the outer envelope of the range of movement of the driver's left hand, corresponding to gripping by the fingertips, Cdb—the outer envelope of the range of movement of the driver's right hand, corresponding to gripping by the fingertips, Pgb—the outer envelope of the range of movement of the passenger's left hand, corresponding to gripping by the fingertips, Pdb—the outer envelope of the range of movement of the passenger's right hand, corresponding to gripping by the fingertips.

These various spherical envelopes cut the outer envelope Pb of the dashboard along curvilinear lines, which divide the outer envelope Pb of the dashboard into different zones, accessible or not accessible to the fingers of one of the driver's or passenger's hands when gripping with three fingers or by the fingertips. These curved lines and the corresponding zones are shown in FIGS. 11a to 11g.

The zone A1 is the part of the dashboard that lies in the intersection of the envelopes Cd and Pg.

The zone B1 is complementary to the zone A1 in the envelope Pb of the dashboard.

The zone A2 is the part of the dashboard that lies in the intersection of the envelopes Cdb and Pgb.

The zone B2 is complementary to the zone A2 in the envelope Pb of the dashboard.

The zone A3 is the part of the dashboard that lies in the junction of the envelopes Cd and Pg.

The zone B3 is complementary to the zone A3 in the envelope Pb of the dashboard.

The zone A4 is the part of the dashboard that lies in the junction of the envelopes Cd, Cg, Pd and Pg.

The zone B4 is complementary to the zone A4 in the envelope Pb of the dashboard.

The zone A5 is the part of the dashboard that lies in the junction of the envelopes Cdb and Pgb.

The zone B5 is complementary to the zone A5 in the envelope Pb of the dashboard.

The zone A6 is the part of the dashboard that lies in the junction of the envelopes Cdb, Cgb, Pdb and Pgb.

The zone B6 is complementary to the zone A6 in the envelope Pb of the dashboard.

In the above definitions, the vehicle is assumed to have a left-hand driving position. In the case of a vehicle with a right-hand driving position, the words driver and passenger merely have to be interchanged in the definitions.

A first object of the invention is to propose a novel architecture of the means for delivering the demisting air and aeration air which makes it possible to increase the space available above the console in the central instrumentation zone of the driving position.

A second object of the invention is to propose a novel architecture of the means for delivering the demisting air and aeration air which makes it possible to simplify the fitting-out of the cockpit particularly by virtue of a reduction in the number of pieces.

A third object of the invention is to propose a novel architecture of the means for delivering the aeration air which allows a gentle-diffusion mode or a forced-diffusion mode, at the choice of the occupants of the vehicle.

SUMMARY OF THE INVENTION

The invention achieves the first two objects due to the fact that the demisting and aeration ducts are formed in an oblong diffusion module which extends transversely above the upper face of the housing and under the upper fascia of the dashboard, this module including an aperture, in its lower face, matching the shape of the upper face of the housing, and, on its upper front edge, the downstream portions of the demisting duct and of the aeration ducts, the downstream portions of the aeration ducts extending transversely on either side of the demisting duct and terminating in aeration vents situated above the zone B4 of the envelope Pb of the dashboard situated outside the intersection A4 of the outer envelopes Cg, Cd, Pg, Pb of the range of movement of the driver's and passenger's right and left hands, corresponding to gripping with three fingers, and directed towards the inside of the passenger compartment.

Advantageously, the diffusion module is obtained by assembling two thin-walled pieces. The downstream portions of the aeration ducts are bounded by two parallel walls with a curvilinear section along vertical planes parallel to the median longitudinal plane of the passenger compartment. These two walls feature convex surfaces at the front side of the diffusion module, and are linked by a plurality of vertical partitions.

In order to achieve the third object of the invention, the aeration vents are equipped with an adjustable convergent/divergent system which makes it possible to vary the exit speeds of the air so as to obtain a gentle-diffusion mode or a forced-diffusion mode. In the gentle-diffusion mode, the total diffusing surface area of the aeration vents is at least equal to 2.5 $dm^2$.

The diffusion module advantageously includes distribution flaps for distributing the air taken into the said module between the demisting duct and the aeration ducts.

BRIEF DESCRIPTION OF THE DRAWINGS

Other advantages and characteristics of the invention will become apparent on reading the following description, which is given by way of example and with reference to the attached drawings, in which:

FIG. 4 is a section through the diffusion module along the line IV—IV of FIG. 3;

FIG. 5 shows the means for adjusting the speed of the air in the aeration vents in forced-diffusion mode;

FIG. 6 shows the means for adjusting the speed of the air in the aeration vents in gentle-diffusion mode;

FIG. 7 is a view in perspective of the diffusion module according to the invention;

DETAILED DESCRIPTION OF THE INVENTION

Figure 1:
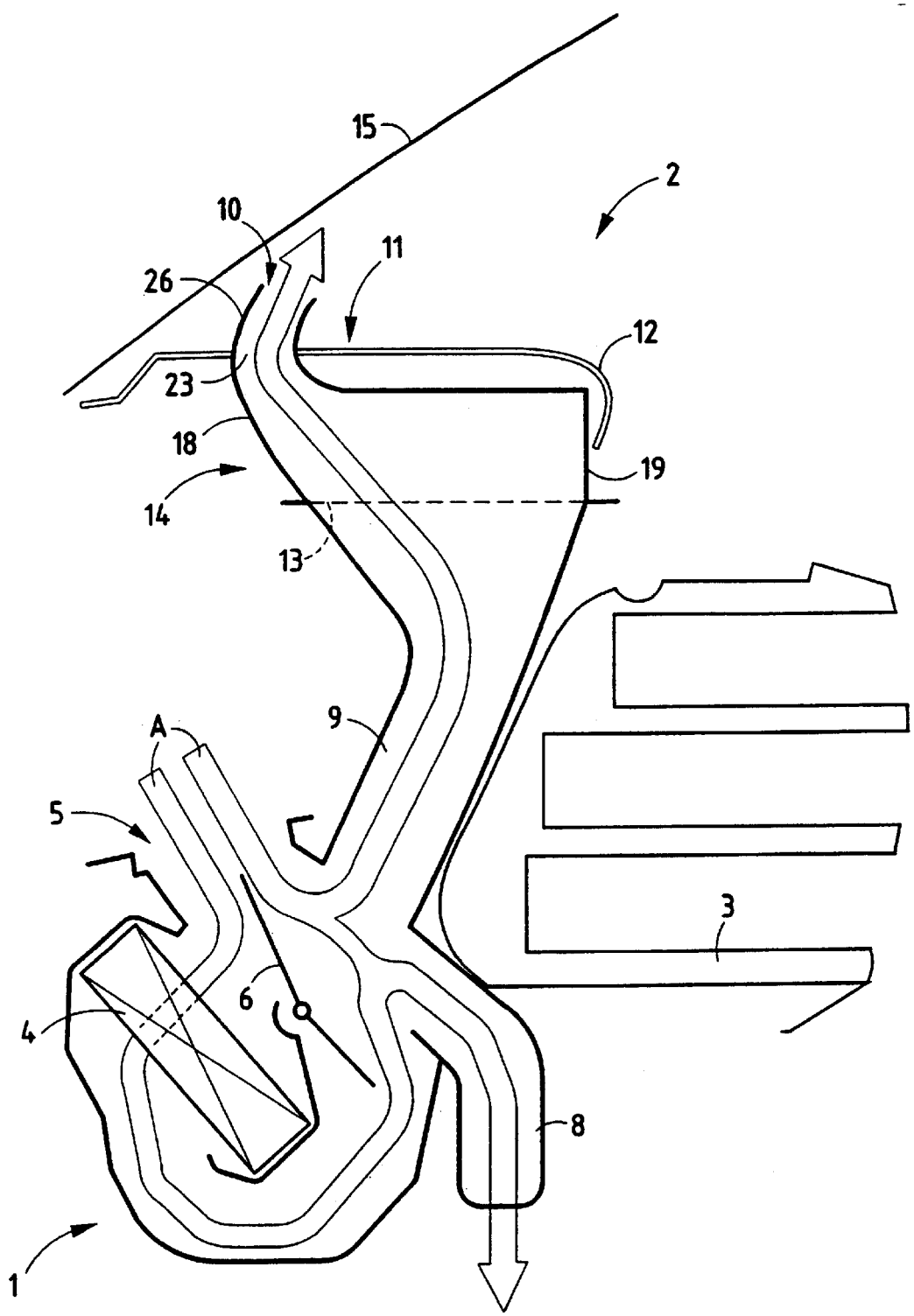
FIG. 1 is a schematic section on the median vertical plane of the cockpit of a vehicle equipped with the air-conditioning device of the invention along the line I—I of FIG. 2.
Figure 2:
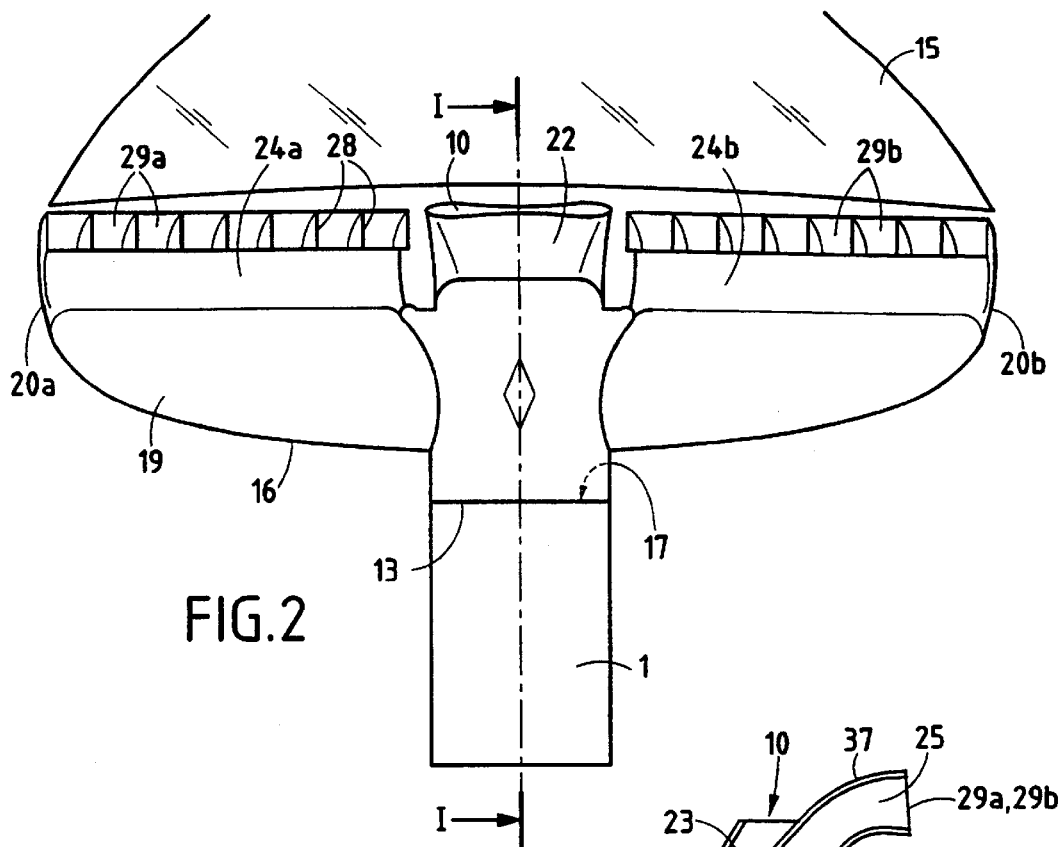
FIG. 2 is a front view of the rear of the air-conditioning device of FIG. 1.

FIGS. 10 and 11a to 11g were discussed in the introduction, and do not require any additional explanation.

The drawings show a device for heating, ventilating and/or air conditioning the passenger compartment of a motor vehicle, which includes, in a housing 1 situated in the central zone of the cockpit 2 of the vehicle and to the front of a central console 3, means 4 for heating some of the air A delivered by a motor-driven fan unit not represented in the drawings. The air A enters the housing 1 through an inlet 5, then is separated by a temperature-setting flap 6 into a first, upper flow and a second, lower flow which passes through a heating branch in which a heat exchanger 4 is installed. The two flows are then reunited in a mixing zone 7, from where the treated air feeds a lower duct 8, intended for heating the lower zones of the passenger compartment, and in particular the front passengers' feet, and a substantially vertical upper duct 9 situated behind the console 3. The upper duct 9 is intended to deliver demisting air to a demisting branch 10 situated in the upper fascia 11 of the dashboard 12, and aeration air to aeration vents also situated in the upper fascia 11 of the dashboard 12. The upper duct 9 opens out in an upper face 13, of rectangular overall shape, of the housing 1. This upper face 13 preferably extends in a substantially horizontal plane, below the upper fascia 11 of the dashboard 12 and to the front of the central console 3.

An oblong diffusion module 14 extends over the entire width of the passenger compartment H and to the rear of the base of the windscreen 15, and is situated between the upper face 13 of the housing 1 and the upper fascia 11 of the dashboard 12. This diffusion module 14, which has only thin walls bounding the air ducts feeding the demisting vent 10 and the aeration vents, has, on its lower wall 16, an opening 17 which fits onto the upper face 13 of the housing 1 and which allows the air delivered through the orifice of the upper face 13 of the housing 1 to be brought into the diffusion module 14.

The diffusion module 14 takes the form of a box bounded by the lower wall 16, a vertical front wall 18, a vertical rear wall 19, the lateral extremities 20a, 20b of which join up with the lateral extremities of the front wall 18, and a substantially horizontal upper wall 21, located under the upper fascia 13 of the dashboard 12. The front wall 18 and the rear wall 19 are connected to the lower wall 16. The upper wall 21 is also connected to the rear wall 19.

The upper wall 21 is extended, towards the windscreen 15, beyond the front wall 19, by three wall portions, with a curvilinear section along vertical planes parallel to the median vertical plane of the cockpit 2, and which are directed upwards. The central wall portion 22 constitutes the rear face of the demisting duct 23. The lateral wall portions 24a and 24b, arranged on either side of the central portion 22, form the rear faces of the aeration ducts 25a and 25b. These two lateral wall portions 24a and 24b extend laterally as far as the extremities of the upper wall 21.

The front wall 18 has a height less than the height of the rear wall 19. The front face of the demisting duct 23 is formed by a curvilinear wall 26, connected to the upper extremity of the front wall 18, and the lateral edges of which are connected to the central wall portion 22 of the upper wall 21. The vent 10 of the demisting duct 23 is directed towards the windscreen 15. The front faces of the aeration ducts 25a and 25b are formed by walls with curvilinear section 27a and 27b, which are substantially parallel to the lateral wall portions 24a and 24b of the upper wall 21. These walls 27a and 27b are connected to the upper extremity of the front wall 18, and are connected laterally to the lateral wall portions 24a and 24b, so as to form the downstream portions of the aeration ducts 25a and 25b.

The front and rear walls of the aeration ducts exhibit convex surfaces seen from the front of the cockpit 2, substantially semi-cylindrical in shape, and they are linked by a plurality of vertical partitions 28, intended to channel the aeration air into vertical planes substantially parallel to the median plane of the cockpit 2. The aeration vents 29a and 29b are arranged above the upper fascia 13 of the dashboard 12 and are directed towards the inside of the passenger compartment. The diffusing surface area of these aeration vents 29a and 29b is at least equal to 2.5 dm$^2$, so as to allow gentle diffusion of the aeration air. With a diffusing surface area of this value, the aeration air leaves the aeration vents 29a and 29b at low speed, and there is no turbulence in the passenger compartment.

The front wall 18 of the diffusion module 14, if appropriate, features reinforcements not shown on the drawings and intended to house indicators for the driver's position. The dashboard 12 is preferably produced in the form of a facing which covers over the diffusion module 14.

As shown in FIGS. 5 and 6, the lateral wall portions 24a and 24b are shaped, close to their upper extremity, so as to form a housing 30 for a flap 31 for adjusting the opening of the aeration vents 29a and 29b. The adjusting flap 31 is controlled from the driver's position and makes it possible to adjust the exit speeds of the aeration air, so as to obtain a forced-diffusion mode in a convergent position of the flap 31 and a gentle-diffusion mode in a divergent position of the flap 31.

Figure 8:
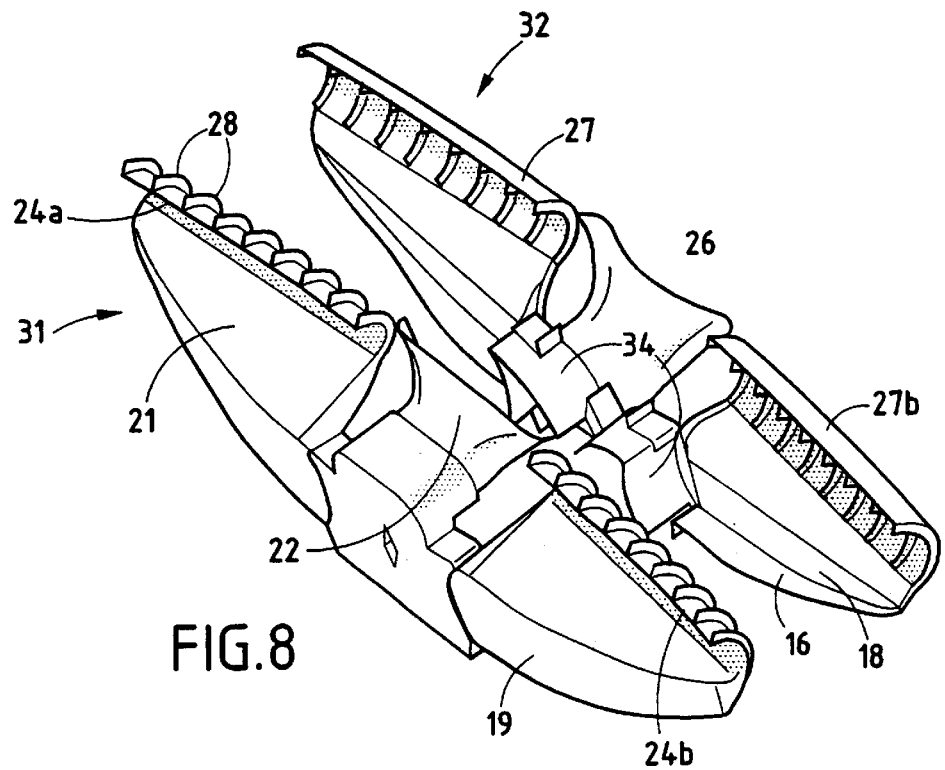
FIG. 8 is a view, in perspective and exploded, of the rear of the diffusion module.
Figure 9:
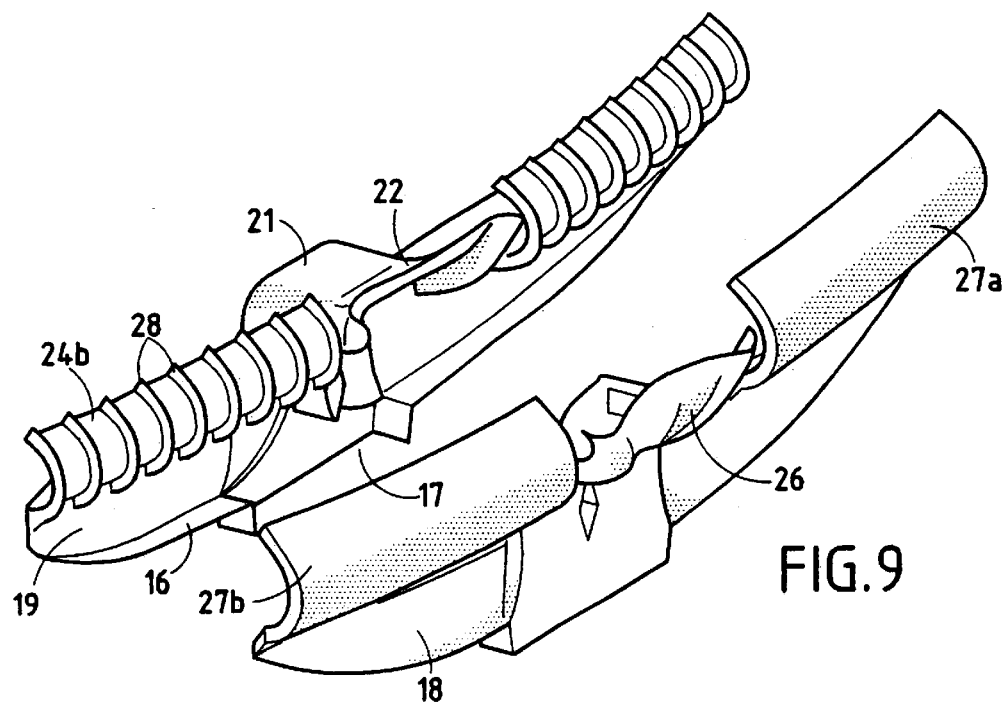
FIG. 9 is a view, in perspective and exploded, of the front of the diffusion module.
Figure 10:
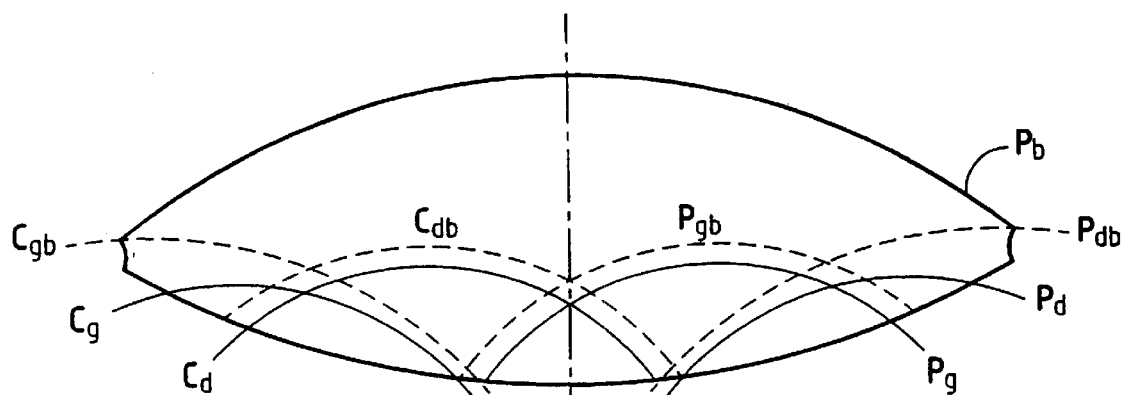
FIG. 10 is a schematic representation, seen from above, of the dashboard and the outer envelopes of the range of movement of the driver's and the passenger's hands, corresponding to gripping with three fingers, and to gripping by the fingertips.
Figure 11A:
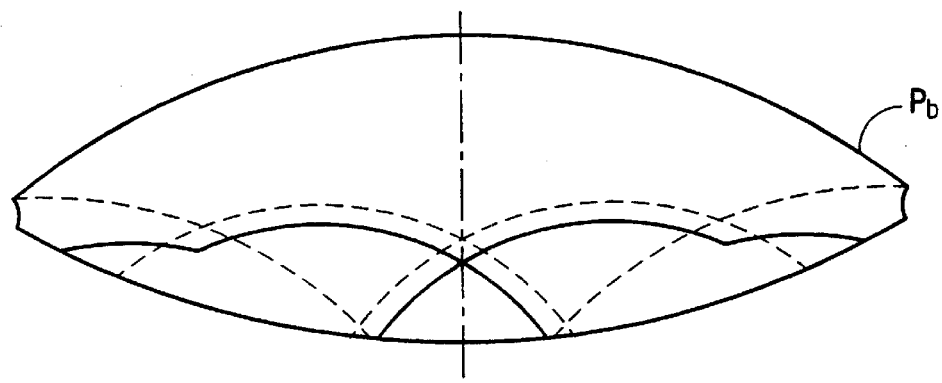
FIGS. 11a to 11g show the zones of the envelope of the dashboard which are accessible and inaccessible to the driver's and the passenger's various hands, corresponding to gripping with three fingers, or to gripping by the fingertips.
Figure 11B:
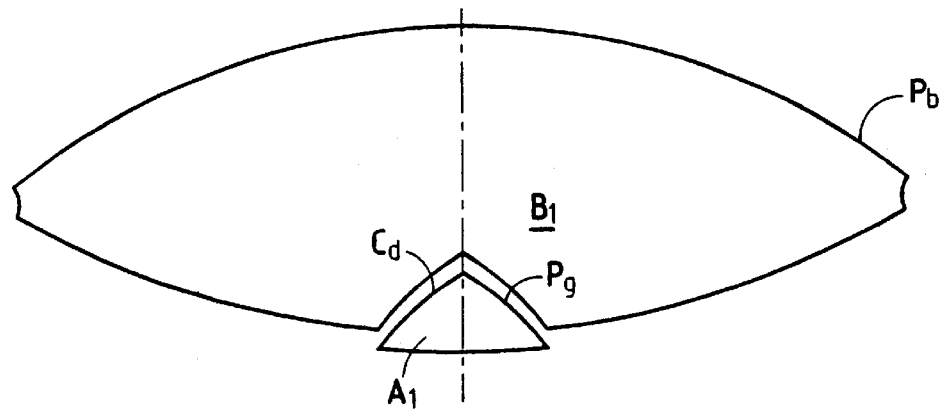
Figure 11C:
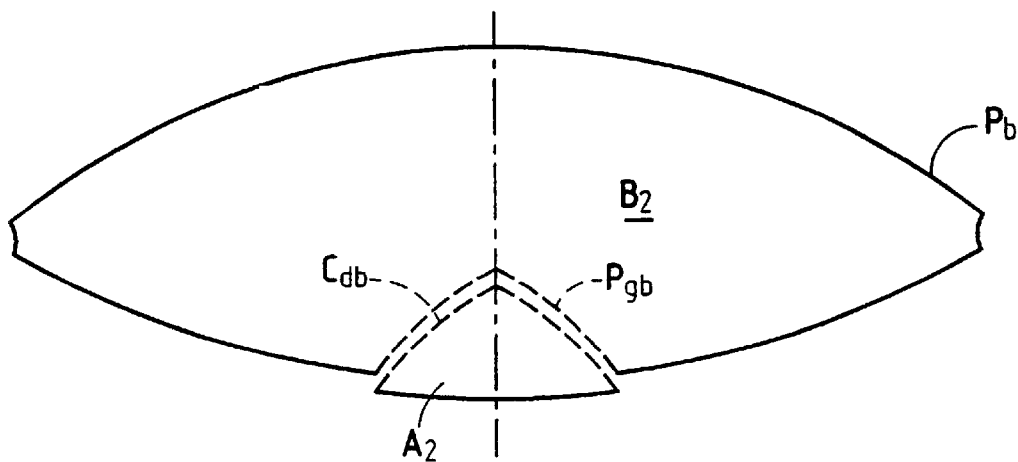
Figure 11D:
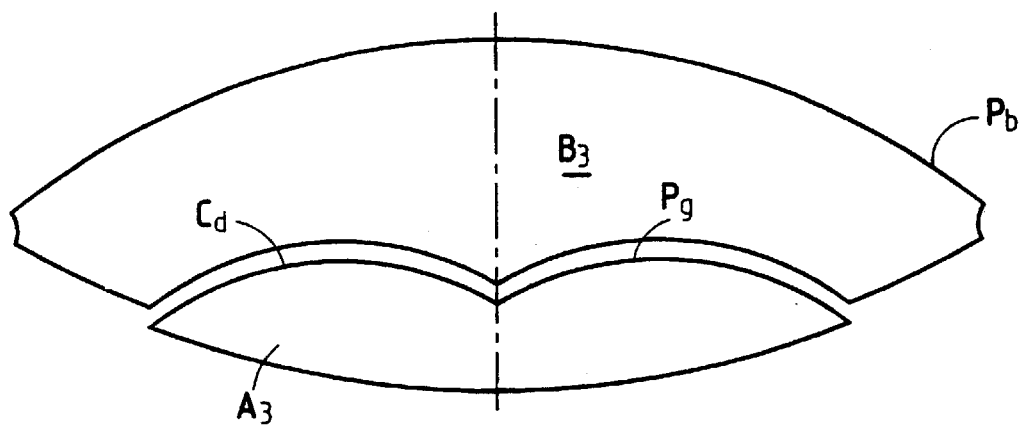
Figure 11E:
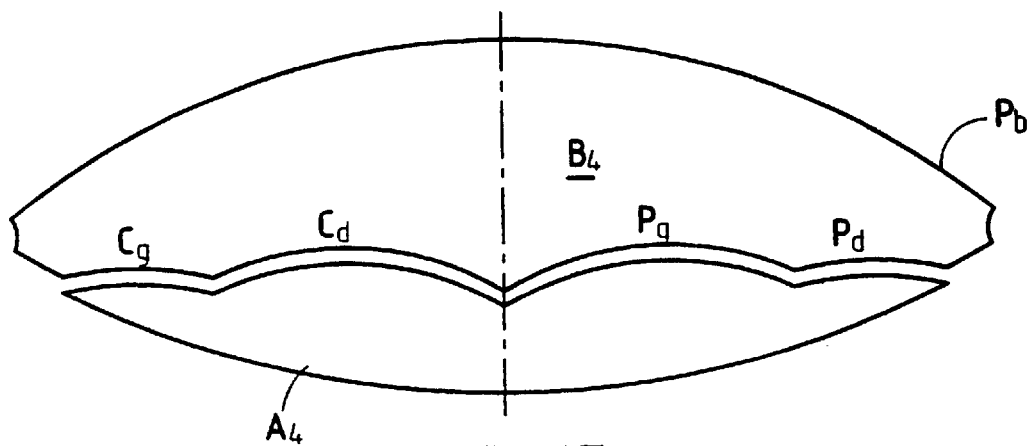
Figure 11F:
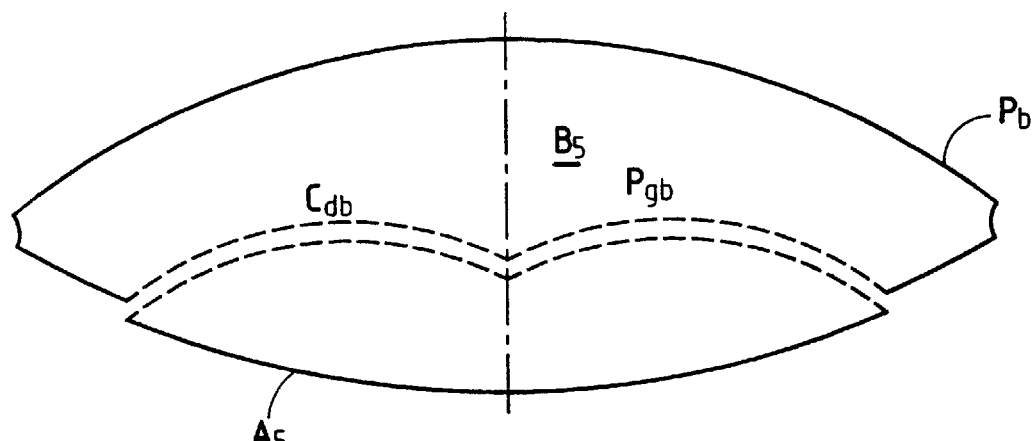
Figure 11G:
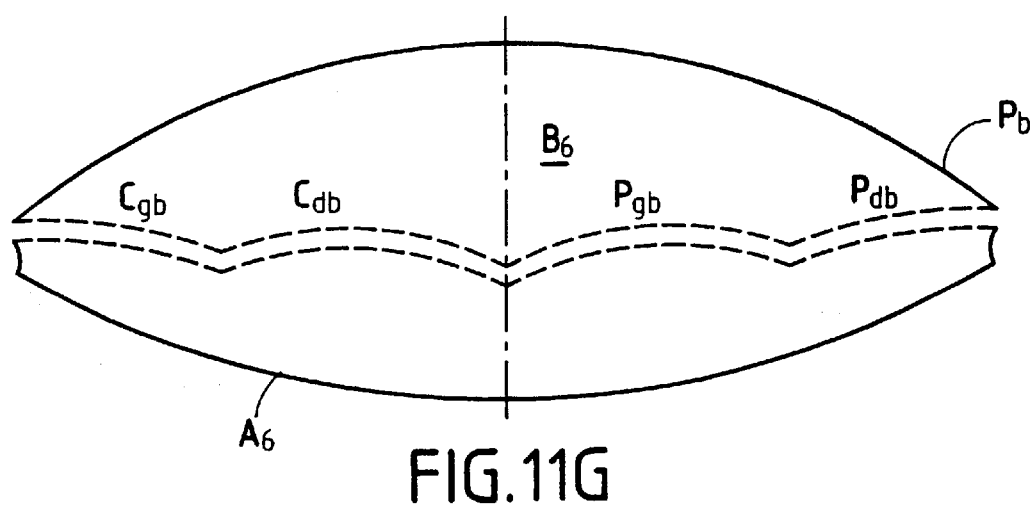
Figure 14:
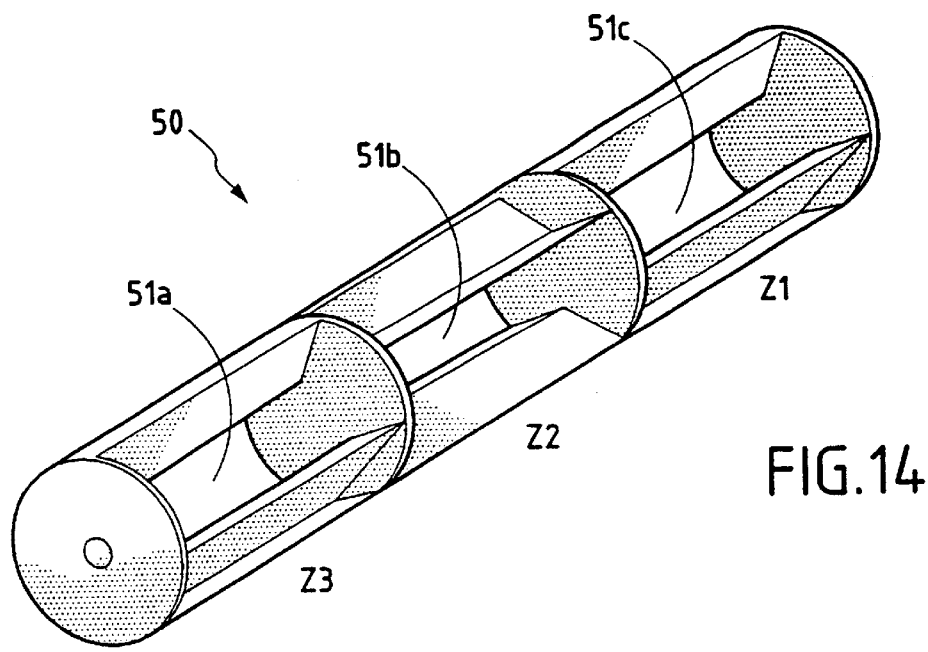
FIG. 14 shows, in perspective, a drum flap with three ducts making it possible to select air-outlet zones of an aeration vent.

The diffusion module 14 is obtained by assembling two thin-walled pieces, 32 and 33, produced by molding from a plastic material according to a known process, by injection for example. The junction plane of these two pieces passes through the lower wall 16, the demisting duct 23 and the aeration ducts 25a and 25b, as shown in FIGS. 8 and 9.

Distribution flaps 34 are mounted on the diffusion module 14 when it is assembled. These flaps 34 make it possible to distribute the air received by the diffusion module 14 between the demisting duct 23 and the aeration ducts 25a, 25b.

The distribution module 14, consisting of two pieces 32 and 33 and equipped with the flaps 31 and 34, can be assembled and tested before it is fitted into the cockpit.

In the description given above, the aeration ducts 25a and 25b are arranged laterally on either side of the demisting duct 25 which is itself situated in the central zone of the cockpit.

Figure 13:
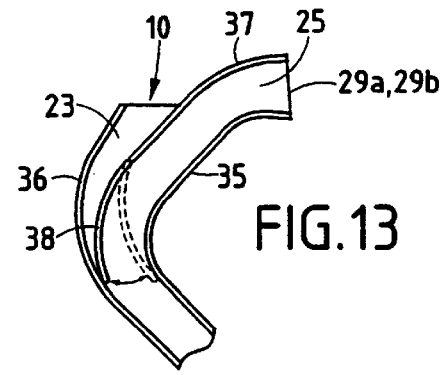
FIG. 13 shows a variant embodiment of the demisting duct.
Figure 3:
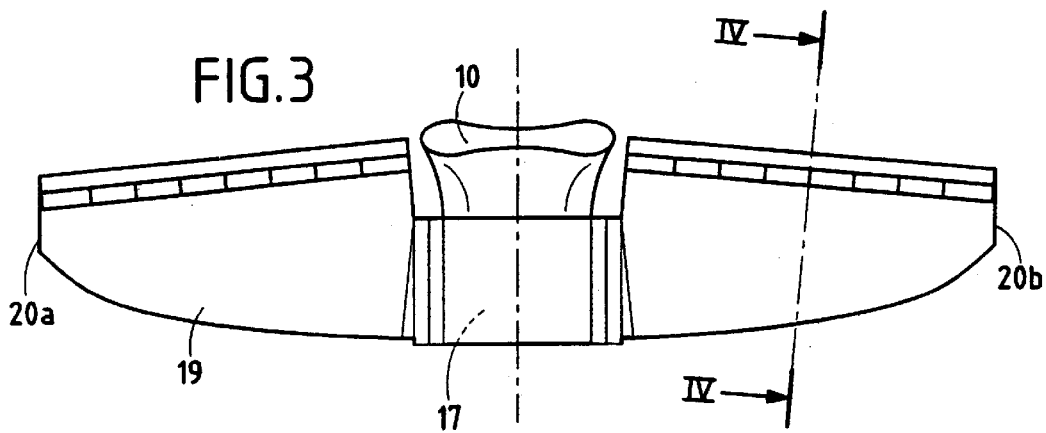
FIG. 3 is a top view of the air-conditioning device of FIG. 1.

As shown in FIG. 13, the diffusion module 14 may include a single aeration duct 25 which extends laterally over the entire width of the dashboard 12, behind the demisting duct 23. In this case, the upper wall 21 of the diffusion module includes a turned-up edge 35, near the front, and the front wall 18 is extended forwards and upwards by a curvilinear wall 36 which forms the front face of the demisting duct 23. An intermediate wall 37 is located between the edge 35 and the wall 36 in order to separate the demisting duct 23 and the aeration duct 25. A distribution flap 38 is then mounted so as to rotate on the lower end 39 of the intermediate wall 37. The intermediate wall 37 is linked to the curvilinear wall 36 and to the edge 35 by a plurality of vertical partitions intended to channel the demisting air and the aeration air.

The aeration vents 29a and 29b are equipped in a known way with vanes for adjusting the orientation of the airflow which are controlled by knurled wheels accessible respectively by the driver and the front passenger.

According to another characteristic of the invention, each aeration duct 25a, 25b is equipped with a means making it possible to select the outlet zones of the aeration airflow.

Figure 15A:
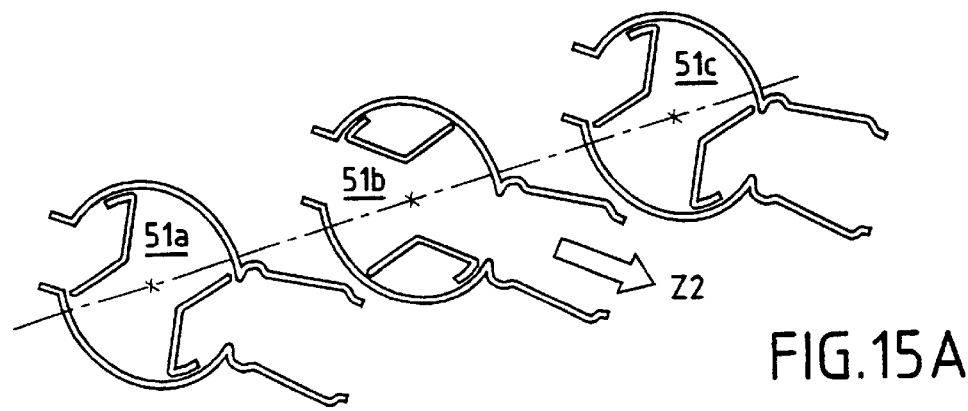
FIGS. 15 to 15d show various portions of the drum flap of FIG. 14.
Figure 15B:
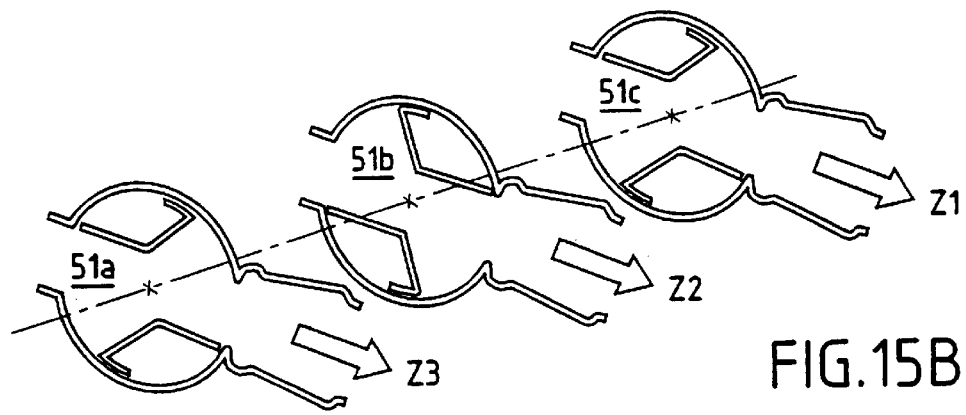
Figure 15C:
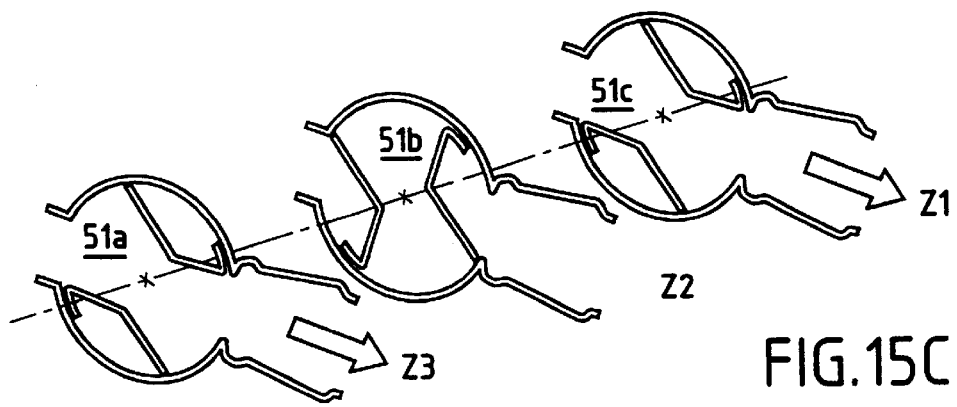
Figure 15D:
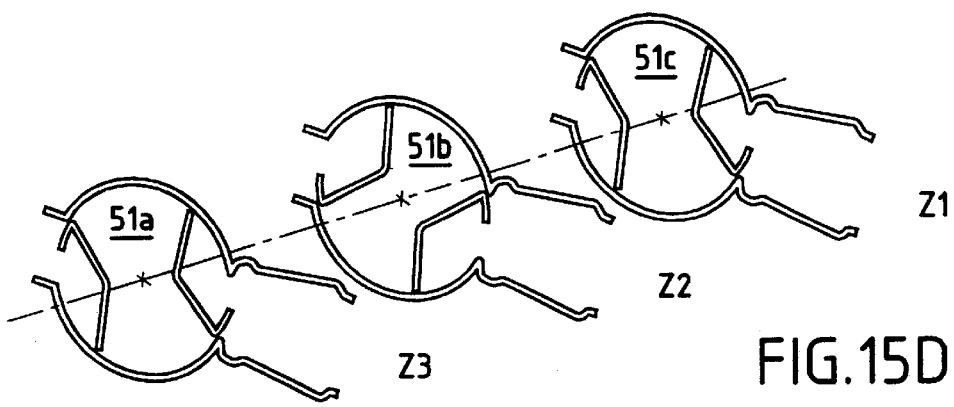

This may take the form, for example, as shown in FIGS. 14 and 15a to 15d, of a drum flap 50, which includes internal channels, offset in angle about the rotational axis of the drum flap 50, so as selectively to feed zones Z1, Z2, Z3 of the corresponding aeration vent 29a or 29b. The drum flap 50 may, for example, include three internal channels 51a, 51b, 51c, the lateral channels 51a and 51c being deduced from one another by translation along the rotational axis. The drum flap 50 may particularly take up four positions as defined below:

a position A, shown in FIG. 15a, in which the central zone Z2 is supplied with air, and the lateral zones Z1 and Z3 of the corresponding aeration vent are closed;

a position B, shown in FIG. 15b, in which the three zones Z1, Z2, Z3 are supplied with air;

a position C, shown in FIG. 15c, in which only the lateral zones Z1, Z3 of the corresponding aeration vent are supplied with air;

a position D shown in FIG. 15d, in which the corresponding aeration vent is closed.

Convergent/divergent flaps 31a, 31b may be combined with this drum flap 50, and these make it possible to alter the exit speed of the air in the zones Z1, Z2, Z3.

Figure 16A:
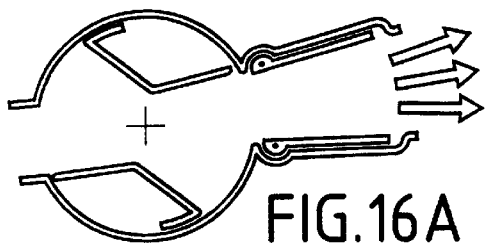
FIGS. 16a to 16c show devices for adjusting the throughput of air.
Figure 16B:
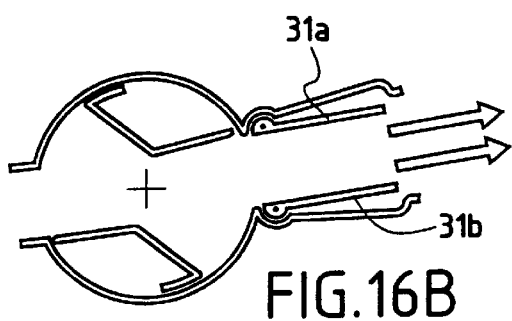
Figure 16C:
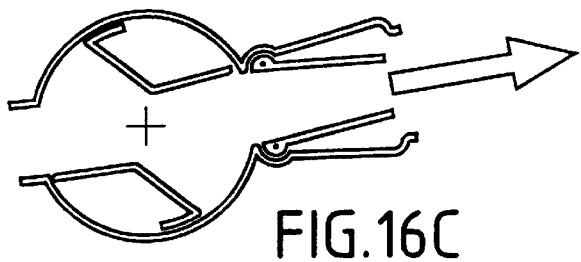

FIGS. 16a, 16b and 16c show three settings of the flaps 31a and 31b which make it possible to diffuse the air respectively at low speed, at medium speed and at high speed.

The positioning of the drum flap 50 and of the convergent/divergent flaps 31a, 31b can be set by manual actuation of knurled wheels situated within the envelope of arm's reach of the driver or of the passenger.

What is claimed is:

1. A device for air conditioning a passenger compartment of a motor vehicle, including air-treatment means being accommodated, at least partly, in a housing provided with a demisting outlet and aeration outlets opening out in a specifically shaped upper face of the housing and adapted to supply treated air to at least one demisting vent and first and second aeration vents provided in a fascia of a dashboard via ducts linking said outlets to said demisting and aeration vents, said dashboard including an upper fascia and a front fascia, wherein said ducts are formed in an oblong diffusion module which extends transversely above the upper face of the housing and under the upper fascia of the dashboard, said oblong diffusion module including an aperture, in a lower face, matching a shape of the upper face of the housing, and, on an upper front edge, downstream portions of the demisting duct and of the aeration ducts, the downstream portions of the first and second aeration ducts extending transversely on either side of the demisting duct and terminating in said aeration vents situated in a zone of an envelope of the dashboard situated outside an intersection of outer envelopes of the range of movement of a driver's right and left hands and passenger's right and left hands, corresponding to gripping with three fingers, and directed towards an inside of the passenger compartment, wherein the downstream portions of the aeration ducts are bounded by two parallel walls with a curvilinear section along vertical planes parallel to a median longitudinal plane of the passenger compartment.

2. The device as claimed in claim 1, wherein said two parallel walls feature convex surfaces at a front side of the diffusion module.

3. The device as claimed in claim 1, wherein said two parallel walls are linked by a plurality of vertical partitions.

4. The device as claimed in claim 1, wherein the aeration vents are equipped with an adjustable convergent/divergent system being adapted to vary exit speeds of the air so as to obtain at least one of a gentle diffusion mode and a forced-diffusion mode.

5. The device as claimed in claim 4, wherein, in the gentle-diffusion mode, a total diffusing surface area of the aeration vents is at least equal to 2.5 dm².

6. A device for air conditioning a passenger compartment of a motor vehicle, including air-treatment means being accommodated, at least partly, in a housing provided with a demisting outlet and aeration outlets opening out in a specifically shaped upper face of the housing and adapted to supply treated air to at least one demisting vent and first and second aeration vents provided in a fascia of a dashboard via ducts linking said outlets to said demisting and aeration vents, said dashboard including an upper fascia and a front fascia, wherein said ducts are formed in an oblong diffusion module which extends transversely above the upper face of the housing and under the upper fascia of the dashboard, said oblong diffusion module including an aperture, in a lower face, matching a shape of the upper face of the housing, and, on an upper front edge, downstream portions of the demisting duct and of the aeration ducts, the downstream portions of the first and second aeration ducts extending transversely on either side of the demisting duct and terminating in said aeration vents situated in a zone of an envelope of the dashboard situated outside an intersection of outer envelopes of the range of movement of a driver's right and left hands and passenger's right and left hands, corresponding to gripping with three fingers, and directed towards an inside of the passenger compartment, wherein the diffusion module includes distribution flaps for distributing air taken into said module between the demisting duct and the aeration ducts.

7. The device as claimed in claim 6, wherein the aeration vents extend transversely over an entire width of the dashboard, the demisting duct being arranged on the front of the aeration duct.

8. The device as claimed in claim 6, wherein the downstream portion of each aeration duct is equipped with at least one flap being adapted to select outlet zones of aeration airflow.

9. The device as claimed in claim 6, wherein the downstream portion of each aeration duct is equipped with a drum flap being adapted to select outlet zones of aeration airflow.

* * * * *